US010593003B2

(12) United States Patent
Moreno et al.

(10) Patent No.: US 10,593,003 B2
(45) Date of Patent: Mar. 17, 2020

(54) SYSTEMS, METHODS AND APPARATUSES FOR IDENTIFYING PERSON OF INTEREST

(71) Applicant: SECURIPORT LLC, Washington, DC (US)

(72) Inventors: Marcelo Martin Motta Moreno, Alexandria, VA (US); Hsiang-yi Yu, Herndon, VA (US); Mohandas Venkobdas, Herndon, VA (US); Seth Stuart Hirsch, Chevy Chase, MD (US); Antonio Enrique Segura, Washington, DC (US)

(73) Assignee: SECURIPORT LLC, Washington, DC (US)

(*) Notice: Subject to any disclaimer, the term of this patent is extended or adjusted under 35 U.S.C. 154(b) by 736 days.

(21) Appl. No.: 13/830,098

(22) Filed: Mar. 14, 2013

(65) Prior Publication Data
US 2014/0279640 A1    Sep. 18, 2014

(51) Int. Cl.
*G06Q 50/26* (2012.01)
*G06F 16/24* (2019.01)
*G06N 5/04* (2006.01)
*H04L 29/06* (2006.01)
*G07C 9/22* (2020.01)
(Continued)

(52) U.S. Cl.
CPC .......... *G06Q 50/265* (2013.01); *G06F 16/24* (2019.01); *G06N 5/04* (2013.01); *G07C 9/22* (2020.01); *G06F 21/32* (2013.01); *H04L 29/06809* (2013.01)

(58) Field of Classification Search
CPC combination set(s) only.
See application file for complete search history.

(56) References Cited

U.S. PATENT DOCUMENTS 7,133,868 B1 * 11/2006 Ruest ................ G06F 17/30893
7,702,694 B1 * 4/2010 Perkins ............. G06F 17/30297
707/790
(Continued)

OTHER PUBLICATIONS

Subcommittee on Aviation, Aviation Security and Passenger Profiling at United States Airports, 2002, US House of Representatives, p. 5-38. (Year: 2002).*
(Continued)

*Primary Examiner* — Patricia H Munson
*Assistant Examiner* — Crystol Stewart
(74) *Attorney, Agent, or Firm* — Miles & Stockbridge P.C.

(57) ABSTRACT

The present disclosure describes systems, methods, and apparatuses for identifying a person of interest. An exemplary method may comprise storing external data received from a variety external sources into a parameterized table, creating a first set of category views on the parameterized table, creating a second set of category views based at least in part on data to be derived from a traveler's personal information to be received, receiving the traveler's personal information generated by an input device and determining whether the traveler is a person of interest by evaluating the personal information against one or more pre-defined profiles using the first and second sets of category views. Each of the one or more pre-defined profiles may comprise one or more rules and a threshold value for determining a likelihood for the traveler to be matched in each of the one or more pre-defined profiles.

23 Claims, 13 Drawing Sheets

(51) Int. Cl.
*G07C 9/00* (2020.01)
*G06F 21/32* (2013.01)

(56) References Cited

U.S. PATENT DOCUMENTS

| | | | | |
|---|---|---|---|---|
| 7,921,036 | B1* | 4/2011 | Sharma | G06Q 20/3674 |
| | | | | 705/14.49 |
| 8,156,097 | B2 | 4/2012 | Cao et al. | |
| 8,311,973 | B1* | 11/2012 | Zadeh | G06N 7/02 |
| | | | | 706/62 |
| 8,799,282 | B2* | 8/2014 | Goldenberg | G06F 17/30536 |
| | | | | 707/708 |
| 9,298,777 | B2 | 3/2016 | Lawrence | |
| 9,501,882 | B2* | 11/2016 | Saravanan | G07C 9/00103 |
| 9,721,078 | B2 | 8/2017 | Cornick et al. | |
| 9,723,010 | B2* | 8/2017 | Kerr | G06F 21/33 |
| 10,049,201 | B2 | 8/2018 | Cornick et al. | |
| 2003/0212651 | A1* | 11/2003 | Hosken | G06F 17/30539 |
| 2003/0215114 | A1* | 11/2003 | Kyle | G06F 21/32 |
| | | | | 382/115 |
| 2003/0225612 | A1* | 12/2003 | DeSimone | G06Q 40/08 |
| | | | | 705/13 |
| 2004/0064453 | A1* | 4/2004 | Ruiz | G06F 21/32 |
| 2004/0078335 | A1* | 4/2004 | Calvesio | G06Q 10/02 |
| | | | | 705/50 |
| 2004/0199785 | A1* | 10/2004 | Pederson | G07C 9/00158 |
| | | | | 340/293 |
| 2004/0267412 | A1* | 12/2004 | Arnouse | B64D 45/0015 |
| | | | | 701/2 |
| 2005/0086088 | A1* | 4/2005 | Stiles | G06Q 10/02 |
| | | | | 705/5 |
| 2006/0004814 | A1* | 1/2006 | Lawrence | G06Q 40/08 |
| 2006/0004866 | A1* | 1/2006 | Lawrence | G06F 17/30011 |
| 2006/0070127 | A1* | 3/2006 | Friedlander | G06F 19/324 |
| | | | | 726/22 |
| 2006/0074986 | A1* | 4/2006 | Mallalieu | G07C 9/00087 |
| 2006/0206351 | A1* | 9/2006 | Hodges | G06Q 10/02 |
| | | | | 705/5 |
| 2007/0005523 | A1* | 1/2007 | Maren | G06K 9/6288 |
| | | | | 706/14 |
| 2007/0112713 | A1* | 5/2007 | Seaman | G06N 5/04 |
| | | | | 705/325 |
| 2008/0208901 | A1* | 8/2008 | Friedlander | G06F 16/2462 |
| 2009/0080708 | A1* | 3/2009 | Mellen | G06F 21/32 |
| | | | | 382/115 |
| 2009/0150442 | A1* | 6/2009 | Barnard | G06Q 30/02 |
| 2009/0177606 | A1* | 7/2009 | Angell | G06N 5/04 |
| | | | | 706/46 |
| 2009/0254572 | A1* | 10/2009 | Redlich | G06Q 10/06 |
| 2009/0256675 | A1* | 10/2009 | Kerr | G06F 21/33 |
| | | | | 340/5.54 |
| 2009/0266882 | A1* | 10/2009 | Sajkowsky | G06K 17/00 |
| | | | | 235/380 |
| 2010/0153389 | A1* | 6/2010 | Angell | G06Q 10/10 |
| | | | | 707/736 |
| 2011/0001604 | A1* | 1/2011 | Ludlow | G07C 9/00031 |
| | | | | 340/5.6 |
| 2011/0004622 | A1* | 1/2011 | Marson | G06Q 10/10 |
| | | | | 707/770 |
| 2011/0119218 | A1* | 5/2011 | Lay | G06F 21/577 |
| | | | | 706/46 |
| 2012/0123821 | A1* | 5/2012 | Rickman | G06Q 40/08 |
| | | | | 705/7.28 |
| 2012/0330959 | A1* | 12/2012 | Kretz | G06Q 40/08 |
| | | | | 707/739 |
| 2014/0221776 | A1* | 8/2014 | Stivoric | G06Q 30/0242 |
| | | | | 600/301 |
| 2014/0373753 | A1 | 12/2014 | Cornick et al. | |
| 2015/0286951 | A1* | 10/2015 | Rigdon | G06N 5/04 |
| | | | | 706/52 |
| 2017/0103260 | A1* | 4/2017 | Eckel | G06K 9/00483 |
| 2017/0154314 | A1* | 6/2017 | Mones | G06Q 10/1053 |
| 2017/0206557 | A1* | 7/2017 | Abrol | G06Q 30/0261 |
| 2018/0075563 | A1* | 3/2018 | Ananthanpillai | G06Q 50/265 |
| 2019/0012451 | A1 | 1/2019 | Cornick et al. | |
| 2019/0031145 | A1 | 1/2019 | Trelin | |
| 2019/0034747 | A1 | 1/2019 | Lupowitz | |

OTHER PUBLICATIONS

International Search Report and Written Opinion dated May 27, 2014, as received in International Application No. PCT/US2014/017683.

Notice from the European Patent Office dated Oct. 1, 2007 concerning business methods[1], *Official Journal of the European Patent Office*, 30(11):592-593 (2007).

* cited by examiner

SYSTEMS, METHODS AND APPARATUSES FOR IDENTIFYING PERSON OF INTEREST

FIELD OF THE DISCLOSURE

The systems, methods and apparatuses described herein relate to improved identification of a person of interest using computer implemented techniques, in particular, identification of a person of interest against pre-defined profiles at a checkpoint such as a border or security checkpoint.

BACKGROUND

For security and identification purposes, travelers travelling via air, land, and/or water typically have to go through checkpoints, at which their travel documents such as drivers licenses or passports are checked. The conventional way of checking the travel documents is to check each traveler's identification information (e.g., name) against a watch list maintained in a computer database. If a traveler's identification matches an entry in a watch list, the traveler may receive special treatment, such as being further questioned, detained, rejected, deported, etc.

Checking travelers' information against a watch list, while useful, has serious deficiencies. For example, the watch list check often merely compares the name on a traveler document to names on a watch list. Moreover, the watch list has to be previously compiled and stored at a central location to be accessed by checkpoints across a region or country. Therefore, the watch list is not a robust solution and does not provide a holistic approach to identification of person of interest at checkpoints. Accordingly, what is needed are systems, methods and apparatuses for identifying a person of interest by evaluating risk probabilities using a holistic approach in real time.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure comprises systems, methods and apparatuses for identifying a person of interest (POI). In certain embodiments, a computer implemented POI system may be provided. The POI system may include one or many computers as terminals and one or more many computers as server(s). The terminals may provide client side software, for example, to interact with authorized users manning the terminals to enter traveler information and to display alerts and messages to the authorized users. The servers may have one or more databases to store data and server side software doing data processing. The data stored on the server(s) may include data received from a variety external sources stored in a parameterized table, a first set of category views created on the parameterized table, a second set of category views created at least in part on data to be derived from a traveler's personal information to be received, and one or more pre-defined profiles. During operation, a traveler's information may be received at a terminal and whether the traveler is a person of interest may be determined by evaluating the personal information against the one or more pre-defined profiles using the first and second sets of category views. Each of the one or more pre-defined profiles may comprise one or more rules and a threshold value for determining a likelihood for the traveler to be matched in each of the one or more pre-defined profiles.

Figure 1:
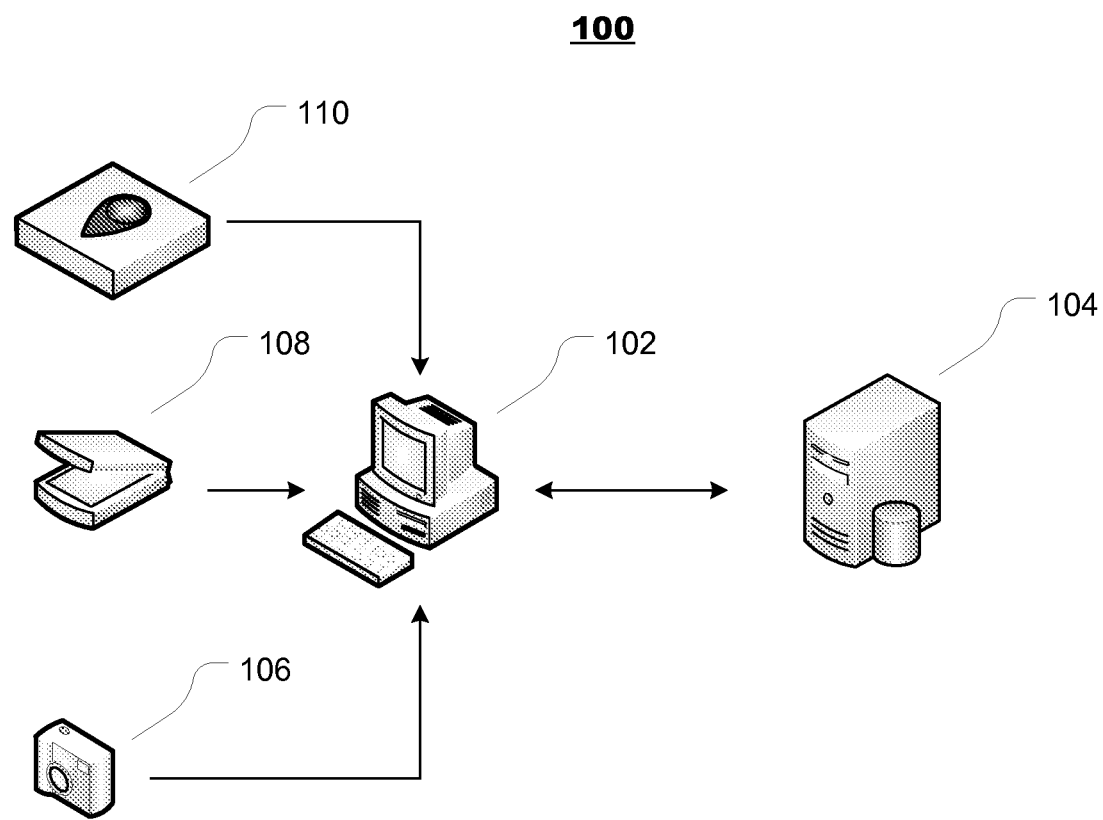
FIG. 1 is a block diagram of an exemplary system according to the present disclosure.

FIG. 1 shows an exemplary system 100 according to the present disclosure. The system 100 may comprise a user terminal 102 and a server computer 104. The system 100 may also comprise a plurality of input devices coupled to the user terminal 102, for example, a passport scanner 108, a digital camera 106 and a biometrics scanner 110. The user terminal 102 may be a desktop personal computer, a laptop, a mobile computing device (e.g., a tablet, smartphone, etc.), or any computing device with a computer processor and display. The server computer 104 may be any computer system that may host one or more computer databases. The user terminal 102 and the server computer 104 may be coupled together by a local area network (LAN), a wide area network (WAN), and/or any suitable network connections using wired and/or wireless signal communication.

The server computer 104 may store a plurality of pre-defined profiles in one or more computer databases. Each pre-defined profile may include instructions that may be executed to search certain relevant data such that when personal information of a traveler is entered at the terminal 102 (e.g., generated by the passport scanner 108, digital camera 106, biometrics scanner 110, or a keyboard or mouse), the instructions for each pre-defined profile may generate a score indicating a likelihood of the traveler to be matched in the respective pre-defined profiles. In one embodiment, the process of receiving traveler's information and storing in the one or more computer databases of the server computer 104 may be referred to as an enrollment process. A non-exclusive list of pre-defined profiles may include a terrorist profile, a drug trafficker profile, a tax evader profile, an arms smuggler profile and a money launderer profile. The enrollment process may trigger a profiler process that execute each rule of each profile to generate a respective score for each profile.

Each pre-defined profile may take a holistic approach to make the determination of whether a traveler fits in that profile, and thus each profile may include searches against relevant information to determine the likelihood of a match. By way of non-limiting example a terrorist profile may be comprised of a single male, between 22-24 years old, who has some form of college education in the humanities, is affluent middle/upper class, who may have previous entries refused, who may previously have had falsified immigration documents, and who paid for the air fare ticket in cash. Thus, the terrorist profile may need the following types of information to generate a score of likelihood that the traveler fits the terrorist profile.

TABLE 1

Types of information needed for the exemplary Terrorist Profile

| Type of information | Information |
| --- | --- |
| Demographics | First Name, Last Name, DOB, Gender, Marital Status, Nationality |
| Education information | Schools attended, education type, highest education level |
| Income information | Yearly income and employment/business details |
| Visa Information | The country where the visa was issued, visa type, any previous visa fraud, and Immigration status |
| Transport information | Country where the travel originated, method of buying ticket (cash/credit), ticket type (one way/return), Transport Company, itinerary |
| Crime records | Any previous criminal records |
| Financial Information | Domestic bank account information, foreign bank account information, domestic assets, foreign assets, credit cards |
| Affiliations | Memberships or donations to different groups or organizations |

Another exemplary profile may be the drug trafficker profile. By way of example and not limitation, a drug trafficker profile may be comprised of a traveler with previous criminal records, who has traveled to/from countries known to be sources of drugs, who has no form of higher education, and who has large cash deposits into his account, and no known employment. Thus, the drug trafficker profile may need the following types of information to generate a score of likelihood that the traveler fits the drug trafficker profile.

TABLE 2

Types of information needed for the exemplary Drug Trafficker Profile

| Type of information | Information |
| --- | --- |
| Demographics | First Name, Last Name, DOB, Gender, Marital Status, Nationality |
| Education information | Schools attended, education type, highest education level |
| Income information | Yearly income and employment/business details |
| Transport information | Country where the travel originated, method of buying ticket (cash/credit), ticket type (one way/return), Transport Company, itinerary |
| Crime records | Any previous criminal records |
| Financial Information | Domestic bank account information, foreign bank account information, domestic assets, foreign assets, credit cards |
| Travel statistics | The number of trips per year, number of trips per year to certain locations |

An exemplary tax evader profile may comprise a tax evader can be a traveler who travels more than 6 times per year, has an income of at least $40,000, and owns 4 cars. Thus, the tax evader profile may need the following types of information to generate a score of likelihood that the traveler fits the tax evader profile.

TABLE 3

Types of information needed for the exemplary Tax Evader Profile

| Type of information | Information |
| --- | --- |
| Demographics | First Name, Last Name, DOB, Gender, Marital Status, Nationality |
| Income information | Yearly income and employment/business details |
| Financial Information | Domestic bank account information, foreign bank account information, domestic assets, foreign assets, credit cards |
| Travel statistics | The number of trips per year, number of trips per year to certain locations |

Another exemplary profile may be the money launderer profile. By way of example and not limitation, a money launderer profile may be comprised of a traveler who owns off-shore companies, who has had wire transfers in large amounts to his foreign bank accounts, and who has an income of at least $40,000 per year, and a criminal record. Thus, the money launderer profile may need the following types of information to generate a score of likelihood that the traveler fits the money launderer profile.

TABLE 4

Types of information needed for the exemplary Money Launderer Profile

| Type of information | Information |
| --- | --- |
| Demographics | First Name, Last Name, DOB, Gender, Marital Status, Nationality |
| Income information | Yearly income and employment/business details |
| Crime records | Any previous criminal records |
| Financial Information | Domestic bank account information, foreign bank account information, domestic assets, foreign assets, credit cards |
| Travel statistics | The number of trips per year, number of trips per year to certain locations |

An exemplary arms smuggler profile may comprise a person that has traveled to or from any one of a list of countries (such as, Libya, Liberia, Angola, Congo, Bulgaria, Russia, Moldova, or Ukraine), who is travelling by boat or chartered plane, whose occupation is a translator or works in a casino, Bonds exchange, Monetary exchange, or shipping. Other contributing factors may include: the company that the person works for may be located in a tax haven (e.g., Grand Cayman), the person uses cash to pay for the trip, his personal income and financial information has inconsistencies, and when the person travels he/she often only stays for a day or two. Thus, the arms smuggler profile may need the following types of information to generate a score of likelihood that the traveler fits the arms smuggler profile.

TABLE 5

Types of information needed for the exemplary Money Launderer Profile

| Type of information | Information |
|---|---|
| Demographics | First Name, Last Name, DOB, Gender, Marital Status, Nationality |
| Education information | Schools attended, education type, highest education level |
| Income information | Yearly income |
| Transport information | Country where the travel originated, method of buying ticket (cash/credit), ticket type (one way/return), Transport Company, itinerary |
| Crime records | Any previous criminal records |
| Occupation/occupation headquarters | What individual does for a living, and the locations of the employer's headquarters |
| Financial Information | Domestic bank account information, foreign bank account information, domestic assets, foreign assets, credit cards |
| Travel statistics | The number of trips per year, number of trips per year to certain locations |

In one or more embodiments, the user terminal 102 and the server computer 104 may be hosted at one geographical location or site (e.g., one airport, one custom checkpoint, etc.). In another embodiment, the user terminal 102 may be hosted at one geographical location and the server computer 104 may be hosted at another geographical location servicing user terminals from various sites not necessarily located together at one place. It should also be noted that the user terminal 102 may be one representative for a plurality of user terminals.

In some embodiments, in addition to the user terminal 102, the scores for each profile for any travelers may also be sent and displayed on other computing devices. For example, one or more computing devices may act as Person of Interest (POI) monitors that may have no capability to input traveler's information but may display profile results (e.g., by running a software application POI Monitor for monitoring enrollment processes on other terminals). Moreover, in some embodiments, the user terminal 102 may be a kiosk type of computer with only a POI application available for receiving traveler information and displaying score reports. While in other embodiments, the user terminal 102 may be a fully functional computer with other user software applications in addition to the POI application.

In one non-limiting embodiment, database replication among distributed databases may be used to keep the most up-to-date data available and synched among a plurality of server computers 104 (only one shown in FIG. 1 as an illustration) located at different locations. In some cases, a central database may be used. Each site's database may be replicated to the central database and then replicated to other sites. This may ensure that all sites may have access to the latest data of other sites and are synched with the data in the central database.

Figure 2:
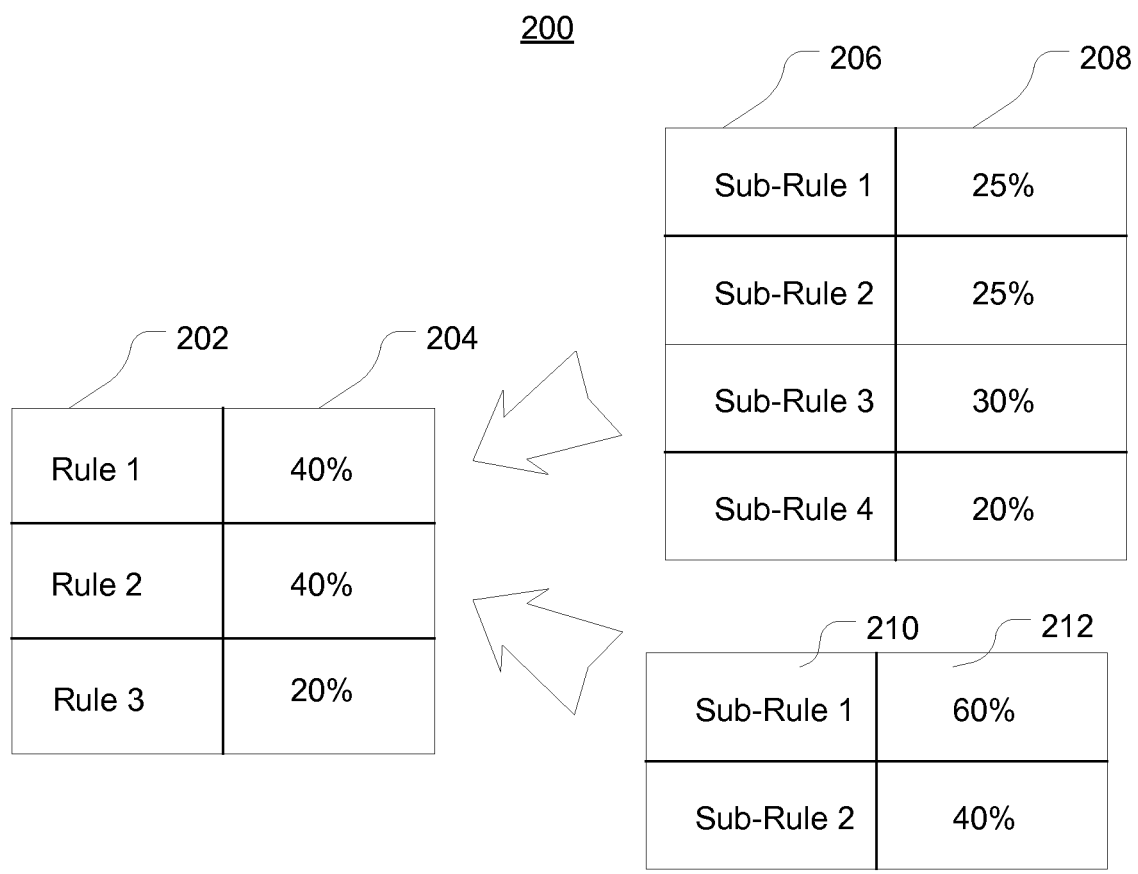
FIG. 2 is a block diagram of an exemplary profile according to the present disclosure.

To generate the likelihood score that the traveler fits one or more pre-defined profiles, each pre-defined profile may comprise one or more rules and a weight may be assigned to each rule. FIG. 2 is a block diagram of a pre-defined profile according to the present disclosure.

As shown in FIG. 2, the pre-defined profile 200 may comprise a plurality of rules 202 (e.g., rule 1, rule 2, and rule 3) and a corresponding list of respective weight 204. The weights assigned to the rules may be in absolute numbers, such as 200, 200 and 100, or in percentage, such as 40%, 40% and 20%. Each rule may have one or more sub-rules. In one embodiment, each sub-rule may also have an assigned weight. The assigned weight may be in an absolute number or a percentage normalized by total weights for all sibling sub-rules under one rule. For example, rule 1 may have a list of sub-rules 206 (e.g., sub-rules 1, 2, 3 and 4) with respective normalized weight percentage 208 (e.g., 25%, 25%, 30%, and 20% respectively for sub-rules 1, 2, 3 and 4). Rule 2 may also have a list of sub-rules 210 (e.g., sub-rules 1 and 2 of rule 2) with respective normalized weight percentage 212 (e.g., 60%, and 40% respectively for sub-rules 1 and 2 of rule 2).

As will be further described below, a rule may also define one or more rule criteria. Each rule criteria may be used to connect passenger data with available sources of information. For example, a rule criteria may be used to generate a subset of data from available sources of information based on the passenger data and use the subset of data either directly for the respective rule's evaluation or for sub-rule evaluation if sub-rules are defined for the respective rule. Exemplary criteria may include one or more conditions based on one or more of: First Name, Last Name, Gender, Date of Birth, Nationality, Enrollment Date, Originating Country, Final Destination Country, Station ID, Station Mode, Document Number, Document Expiration Date, Document Type Name, Fingerprint, Visa Number, Visa Issue Date, Visa Expiration Date, Transport Company Name, Flight Number, and other suitable identification information (such as photo, biometrics information, traveler details, passport chip number, etc.). Each rule criteria may also have a respective weight and a criteria weight threshold. In some embodiments, the criteria weight may be used to evaluate whether a relevant entry from a source table should be selected for further evaluation (e.g., a sub-rule) but the criteria's weight may not be counted in the rule score evaluation. Also, in various embodiments, a rule may have one or more rule criteria, or one or more sub-rules, or both.

Moreover, in some embodiments, the weights assigned to the rules, sub-rules and thresholds may be in absolute numbers instead of percentages. For example, in one embodiment, the rule 1, rule 2 and rule 3 may have weights of 220, 220 and 110 respectively, and the profile 200's threshold may be 275. In this embodiment, the relative ratio of each rule's weight to the total weights of all rules and the relative ratio of each sub-rule's weight to the total weights of all sibling sub-rules may be the same percentages described above.

Figure 3:
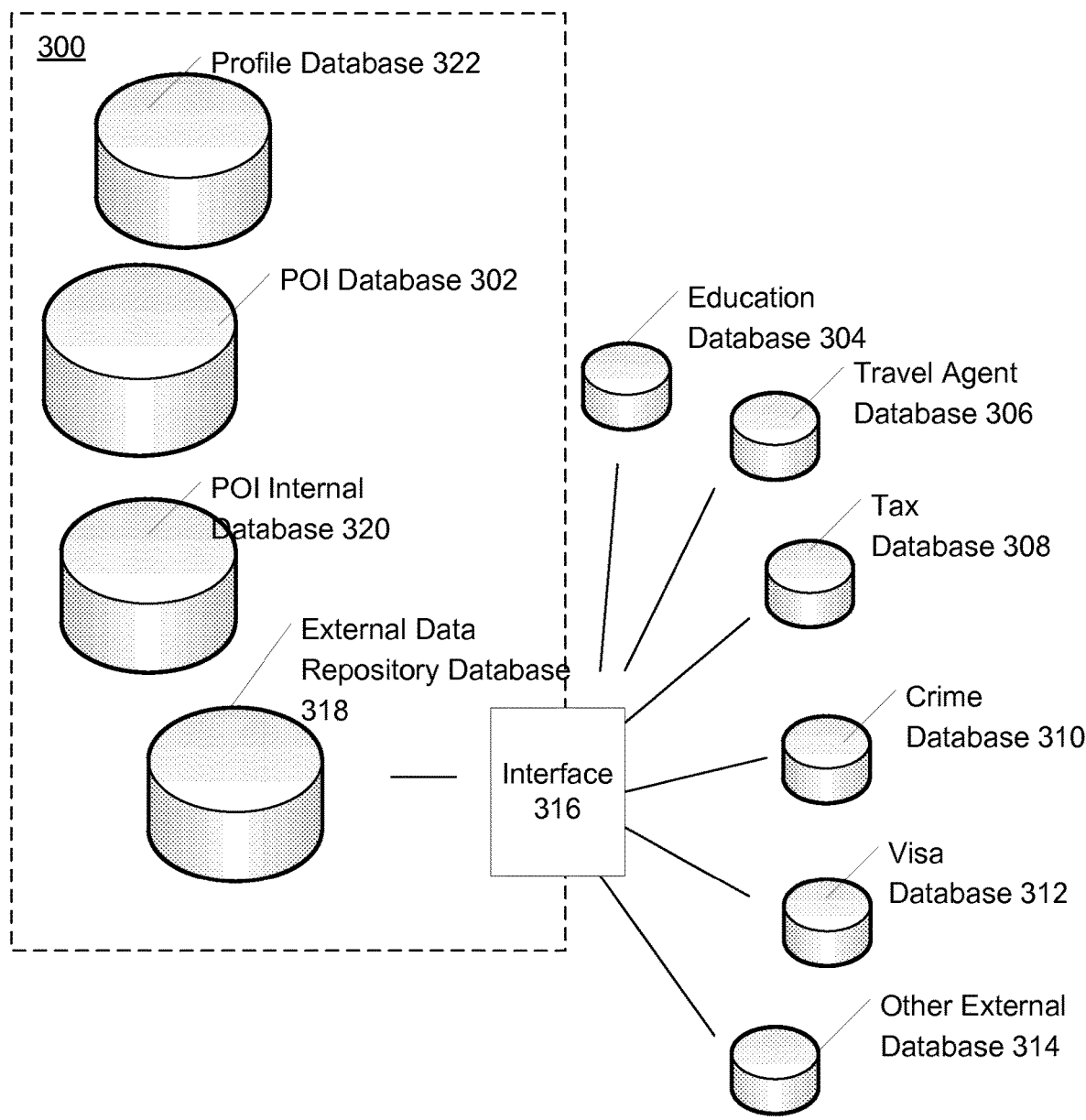
FIG. 3 is a block diagram of one exemplary database architecture according to the present disclosure.

The scoring process for each pre-defined profile may search a variety of types of data in real time. These variety of types of data may be collected from various sources. FIG. 3 is a block diagram of one exemplary database architecture according to the present disclosure. As shown in FIG. 3, a data storage 300 for a POI system may comprise a POI database 302, an external data repository database 318, a POI internal database 320, and a profile database 322. The external data repository database 318 may receive various data from external sources via an interface 316. The external sources may include, but are not limited to, an education database 304, a travel agent database 306, a tax database 308, a crime database 310, a visa database 312 and one or more other external database represented as the other external database 314.

The POI database 302 may store traveler information generated at the input devices. The POI database 302 may also store other data for related transactions. In one embodiment, the POI database 302 may store configuration information for various software applications for a POI system (e.g., POI Monitor Application, Profile Manager Application, External Data Manager Applications, etc.). The configuration information may be saved in XML and may be encrypted in some embodiments.

In one embodiment, the external data repository database 318 may include a generic table EXT_DATA to store data from the external data sources. The generic table may have a generic structure that can accommodate data from a variety of sources and having a variety of structures and formats. In one non-limiting embodiment, the generic table may be a parameterized table and the interface 316 may use configuration files for uploading data from the external data sources into the relevant columns of the parameterized table. One exemplary structure of the parameterized table may be as follows:

faster search. It should be noted that the type of data stored in columns (e.g., characters, numerals, or dates) and the number of columns (e.g., 50 columns of the type character, 10 columns of the type numeral, or 5 columns of the type date) are exemplary and other embodiments may include a different set of columns types and numbers of each type of column.

The configuration file may include a column definition for each data category in the parameterized table. For example, the configuration file may describe the data format, and the logical attribute names and mappings to the actual table columns of the parameterized table. The data loading process may read the configuration file and load the data into the parameterized table according to the mapping defined in the

TABLE 6

Exemplary Structure of a Parameterized Table

| Column Name | Data Type | Description |
| --- | --- | --- |
| Source_type | VARCHAR(10) | This field may indicate the type of the data such as Tax, Crime, Immigration etc. Examples of data values are 'Tax1', 'Immigration' etc. The value may be specified in the configuration file for the external data source. Further, the value may be used in the views data select criteria on this table. In some embodiment, the table may be partitioned and if the table is partitioned, this field may be the partition key. INDEXED |
| LastUpdate | DATETIME | Last update date. For the newly inserted record, it's the insertion date/time. For an updated record, it holds the updated date/time. INDEXED |
| C1 | NVARCHAR(1000) | Character field. INDEXED |
| C2 | NVARCHAR(1000) | Character field. INDEXED |
| C3 | NVARCHAR(1000) | Character field. INDEXED |
| C4 | NVARCHAR(1000) | Character field. INDEXED |
| C5 | NVARCHAR(1000) | Character field. INDEXED |
| C6 | NVARCHAR(1000) | Character field. INDEXED |
| . . . | NVARCHAR(1000) | Character field. INDEXED |
| C10 | NVARCHAR(1000) | Character field. INDEXED |
| C39 | NVARCHAR(1000) | Character field. |
| C41 | NVARCHAR(2000) | Character field. |
| C42 | NVARCHAR(2000) | Character field. |
| . . . | NVARCHAR(2000) | Character field. |
| C50 | NVARCHAR(2000) | Character field. |
| N1 | NUMBER | Number field. INDEXED |
| N2 | NUMBER | Number field. INDEXED |
| N3 | NUMBER | Number field. INDEXED |
| N4 | NUMBER | Number field. INDEXED |
| N5 | NUMBER | Number field. INDEXED |
| N6 | NUMBER | Number field |
| N7 | NUMBER | Number field |
| N8 | NUMBER | Number field |
| N9 | NUMBER | Number field |
| N10 | NUMBER | Number field |
| D1 | DATETIME | Date and Time field. INDEXED |
| D2 | DATETIME | Date and Time field. INDEXED |
| D3 | DATETIME | Date and Time field. INDEXED |
| D4 | DATETIME | Date and Time field |
| D5 | DATETIME | Date and Time field |

As shown in Table 6, the parameterized table may have a Source type column to identify the external data source of the data and a LastUpdate column to record the date and time for the most recent update. Other data columns of the parameterized table may have generic column names for different type of data. For example, columns C1 through C50 may be used to store character based data fields, columns N1 through N10 may be used to store numeric data values and columns D1 through D5 may be used to store date time data entries. In one non-limiting embodiment, data fields stored in some of the data columns may be indexed for configuration file. In one embodiment, the configuration file may be language or country specific.

In one non-limiting embodiment, the configuration file may be a text file including comments. For example, a comment line in the configuration file may start with two hyphens (—) and these comment lines may be ignored by a configuration file processing operation executed, for example, at the interface 316. As shown in Table 7 below, each data field may have an attribute name, a data type, a table column name indicating the column of the parameterized table, and an optional data format. In some embodiments, the configuration may be an XML file. Moreover, in some embodiments, the configuration file may also be encrypted.

TABLE 7

Structure of a Configuration File

DataCategoryName=<Category Name>
--This is a comments line
Attribute Name-Data Type - Table Column-Optional Format
Attribute Name-Data Type - Table Column-Optional Format
Attribute Name-Data Type - Table Column-Optional Format
<more attribute configurations>

An exemplary configuration file and sample data corresponding to tax data (e.g., from the tax database 308) may be as follows.

TABLE 8

Configuration File for Tax Data

DataCategoryName=Tax
First Name-C-C1-
Last Name-C-C2-
DateOfBirth-D-D1-YYYYMMDD
Tax Year-N-N1-
Income-N-N2-
TaxAmt-N-N3-
Address-C-C3-
Nationality-C-C4-

TABLE 9

Sample Tax Data

John,Smith,19700623,2009,63000,3832,
"1234 First Street,North West, Washington DC",SL
Arnold,Doe,19620306,2009,86231,12342,
"9481 Second Street, New Town, Virginia 20173",US
Jill,Brown,19740223,2009,62896,4023,
"13456 Times Circle, Alexandria, California 79245",UK
Dan,Slow,19810522,2011,35829.35,4321.42,
"87 Main Street, Apt 37B, El Paso, Texas 54921",SL As shown above in Table 8, the data for first name, last name, address and nationality may be stored in columns C1, C2, C3 and C4 of the parameterized table, respectively. Further, data for tax year, income and tax amount may be stored in columns N1, N2 and N3, respectively. And data for date of birth may be stored in column D1 in the format of YYYYMMDD. Table 9 shows exemplary tax data that may be loaded into the parameterized table according to the configuration file shown in Table 8. It should be noted that if a data field may includes commas (e.g., the address field), the string may be enclosed in double quotes.

An exemplary configuration file and sample data corresponding to crime data (e.g., from the crime database 310) may be as follows.

TABLE 10

Configuration File for Crime Data

DataCategoryName=Crime
First Name-C-C1-
Last Name-C-C2-
DateOfBirth-D-D1-YYYYMMDD
CrimeCode-C3-
JailLocation-C4
JailType-C5

TABLE 10-continued

Configuration File for Crime Data

PrisonerNumber-C6
ArrestDate-D-D2-YYYYMMDD
JailTermMonths-N-N1
ReleaseDate-D-D3-YYYYMMDD
JailEarnings-N-N2

TABLE 11

Sample Crime Data

Johnny,Smith,19700623,Tax Crime,VA34,Sev2,VA34-1457,20080623,
120,,6723
Bill,Horrible,19720806,Robbery,MD28a,Sev2,MD28-23892,20000423,
60,20050422,25983

As shown above in Table 10, in the case of crime data, the data for first name, last name, address, crime code, jail location, jail type and prisoner number may be stored in columns C1, C2, C3, C4, C5 and C6 of the parameterized table, respectively. Further, data for jail term in months, and jail earnings may be stored in columns N1 and N2, respectively. And data for date of birth, arrest date and release date may be stored in columns D1, D2 and D3 in the format of YYYYMMDD. Table 11 shows exemplary crime data that may be loaded into the parameterized table according to the configuration file shown in Table 10.

In addition to tax and crime data as described above, other categories of data may include, by way of example and not limitation, contact information, education, immigration status, travel agent, domestic bank information, foreign bank information, assets, credit cards, etc.

In one embodiment, when loading a file from the external data source, the data may be first inserted into a staging table. The staging table may give the flexibility of redoing the loading process when errors are encountered in the data loading process. Also, the staging table may help to protect the profiler processes (e.g., the operation to generate the profile scores for a traveler) such that the profiler processes will not be affected during the data load. Once data is determined to be good in the staging table, it can be moved to the parameterized table. The structure of the staging table may be the same as the parameterized table but optionally the staging table may not need to be indexed and may not need to be partitioned. In some embodiments, in addition to the staging table, the external data repository database 318 may also have an archive table. The archive table may have the same structure as the parameterized table with an extra column to indicate the archived date, and may hold data moved out of the parameterized table for a configurable period of time before permanently deleting the data.

The POI internal database 320 may be a data warehouse that may contain reference tables, reporting/dash boarding tables/views and statistical and other useful data tables. The reference tables may include, for example, the list of airlines, countries, ports, sites, etc. The reporting/dash boarding tables/views may be tables used for creating custom reports/dash boards as well as default reports/dashboards. The statistical and other useful data tables may include statistics tables (e.g., number of travelers per year), which may be used for profiling purposes. The data for the POI internal database 320 may be populated and refreshed using extract/transform/load (ETL) processes executed on data of other databases. For example, the statistics tables may be populated and refreshed by ETL processes against the POI database 302. The POI internal database 320 may also contain stored procedures and functions that perform the ETL processes. In some embodiments, the data generated by the ETL processes may be referred to as ETL data and the tables storing the data may be referred to as ETL_Data tables. The exemplary ETL_Data tables may include Demographics, Travel Statistics, Transport, Visa, Education, Income, Immigration, Visa Fraud, Travel Agents Info, Financial, Assets, Credit Cards and Crime Records. Exemplary Demographics and Visa tables are as follows.

TABLE 16

Demographics

| Column Name | Source Database | Source Table | Source Column |
|---|---|---|---|
| Traveler_Unique_ID | POI database 402 | PersonInformation | UniquePersonIdentifier |
| First_Name | POI database 402 | PersonInformation | Firstname |
| Last_Name | POI database 402 | PersonInformation | Lastname |
| Gender | POI database 402 | PersonInformation | Genre |
| Date_Of_Birth | POI database 402 | PersonInformation | DateOfBirth |
| Nationality | POI database 402 | PersonInformation | Get Country name from CountryID (to be linked with Document tables) |

TABLE 17

Visa

| Column Name | Source Database | Source Table | Source Column |
|---|---|---|---|
| Traveler_Unique_ID | POI database 402 | PersonInformation | UniquePersonIdentifier |
| Type | POI database 402 | Visa, VisaType | VisaTypeID, Name |
| VisaDuration | POI database 402 | Visa | Duration |
| VisaExpirationDate | POI database 402 | Visa | ExpirationDate |

Figure 4A:
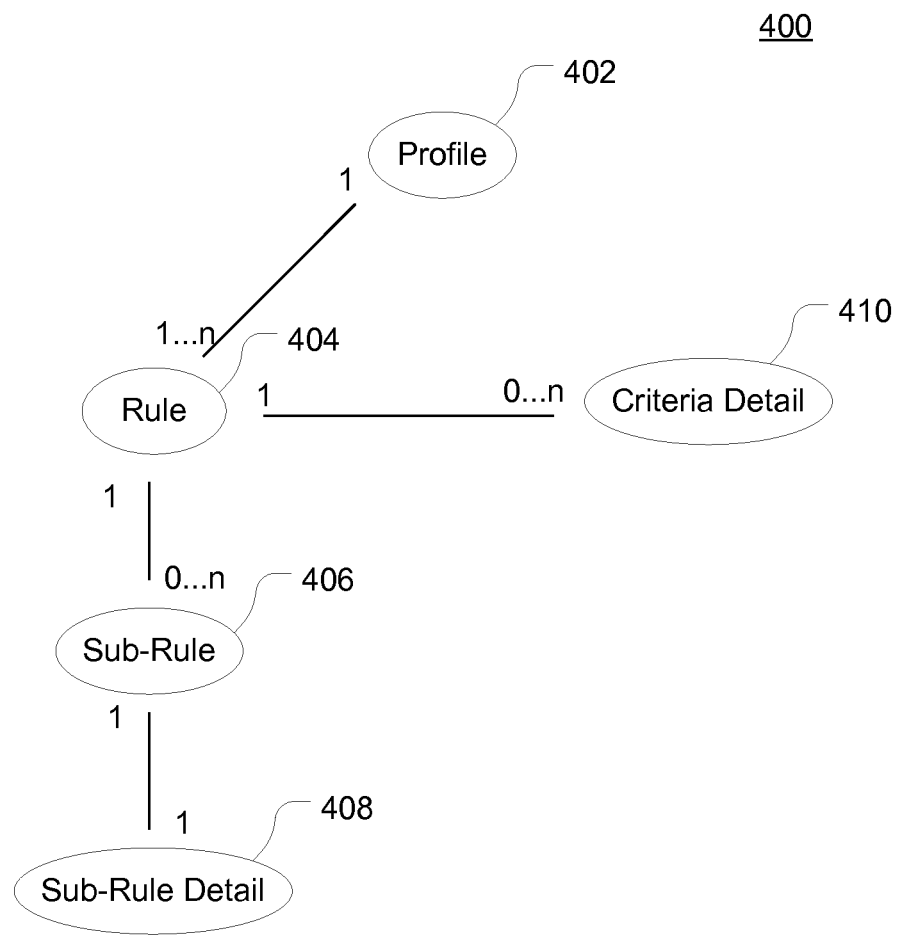
FIG. 4A is an entity relationship diagram for a profile according to the present disclosure.

The profile database 322 may contain tables/views and stored procedures for profile management and profiler process execution. For example, the profile database 322 may contain tables for data source, profile, rule, sub-rule, criteria definitions, and profile result. FIG. 4A illustrates an exemplary entity relationship 400 for profiles, rules, criteria and sub-rules. Each entity in the entity relationship 400 may correspond to an entry in a respective table. For example, a profile 402 may correspond to an entry in a profile table, a rule 404 may correspond to an entry in a rule table, etc. In some embodiments, a profile 402 may include one or more profile definitions, a profile threshold, an execution type (e.g., off, run in background, run in foreground, etc.). In some embodiments, the profile table may store profile definitions in XML format. Moreover, in some embodiments, a profile 402 may have two profile definitions. The first one may be a profile definition currently in effect and will be executed if turned on. The second one may be a profile definition still under development. Once the second one is committed, it may be validated and copied to overwrite the first one while the original first one may be deleted.

As shown in FIG. 4A, a profile 402 may have one or more rules 404 stored in a rule table. A rule 404 may have zero or more sub-rules 406 stored in a sub-rule table and zero or more criteria 410 stored in a criteria details table. A sub-rule 406 may have a sub-rule detail 408 stored a sub-rule detail table.

Figure 4B:
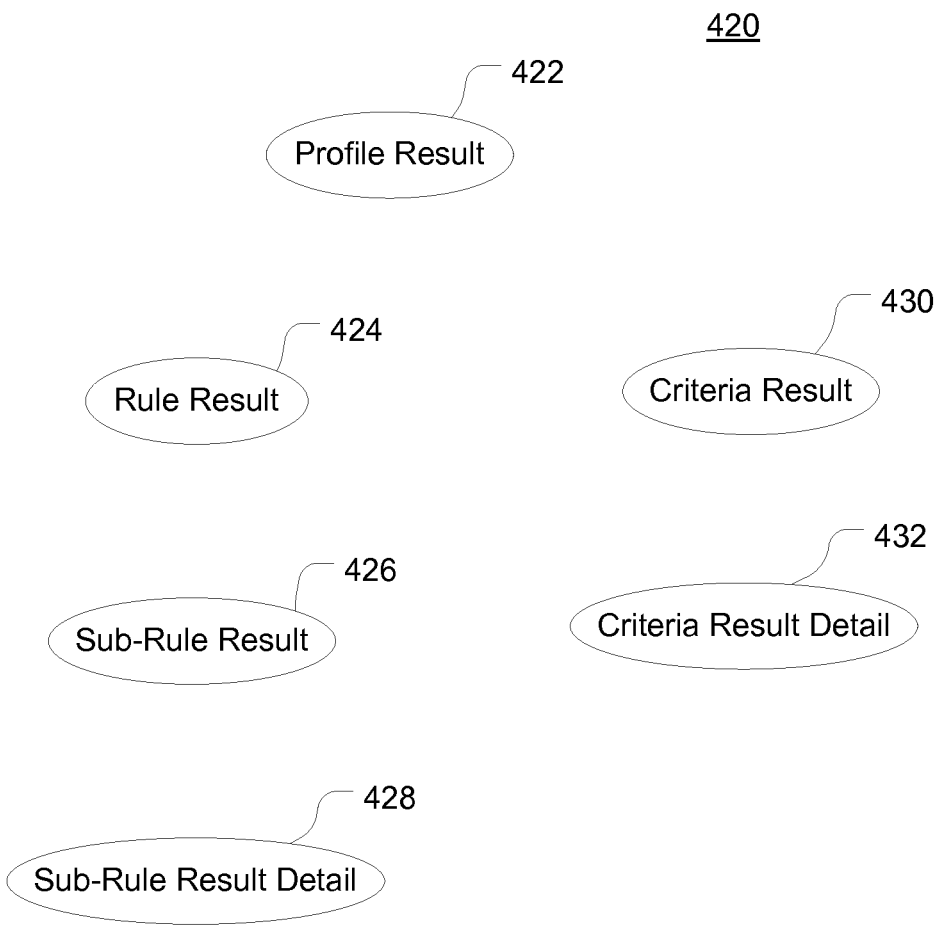
FIG. 4B is an entity relationship diagram for a profile result according to the present disclosure.

FIG. 4B illustrates an exemplary entity relationship 420 for the profiler process results stored in the profile database 322. Each entity of the entity relationship 420 may correspond to an entry in a respective result table. In some embodiments, as shown in FIG. 4B, a profiler process may generate zero or more profile result 422, zero or more rule result 424, zero or more sub-rule result 426, zero or more sub-rule result detail 428, zero or more criteria result 430 and zero or more criteria result detail 432. Because the profiler execution does not always generate a result for either profile, rule, sub-rule, or criteria, there is no one-to-one or one-to-many relations between any of the entities of the entity relationship 400.

In some embodiments, as will be described below, the entries in the criteria result detail table generated by one rule execution may form a data set to be used for this rule's sub-rule execution and the entries in the sub-rule result detail table generated by the sub-rule execution may be a subset of the data set in the criteria result detail table. In these embodiments, the structure of the criteria result detail table and sub-rule result detail table may include all columns of the EXT_Data table to hold data entries selected from the EXT_Data table that matches the corresponding criteria and sub-rule.

In some embodiments, the criteria for a rule may be executed first during an enrollment process and evaluated to check if it exceeds the criteria threshold. If the criteria exceeds the threshold, the sub-rules of the rule may be executed on the data set resulted from the criteria execution. If the rule does not have any sub-rules, the sum of criteria weights may be considered to calculate the rule score if the criteria condition is met. In this case, if the criteria condition is not met, the rule score may be set to zero.

The profile database 322 may also contain tables holding new data generated during an enrollment process that corresponds to data stored in the ETL_Data tables. A non-limiting list of such tables may include: Demographics_New, Travel Statistics_New, Visa_New, Transport_New. The tables with a "_New" suffix may have the same table structure as their corresponding tables without the suffix and may be populated with a micro-ETL process during which all the newly entered data of the traveler may be extracted, transformed and inserted. In one embodiment, these _New tables may be referred to as local atomized tables and newly entered data they store may be referred to as newly atomized data.

In one or more embodiments, the profile database 322 may contain various category views. A first set of the category views may be created on the parameterized table of the external data repository database 318 according to different data categories. For example, if there are 8 different categories of external data, then 8 category views may be created on the parameterized table for each category of the data. The exemplary first set of category views may include, by way of example and not limitation: contact information, education, tax, immigration status, travel agent, domestic bank information, foreign bank information, assets, credit cards and crime. The views may map the logical attribute of the data to the physical columns of the parameterized table. In one embodiment, the views may be created using the category name specified in the configuration file for the data category. A second set of category views may be created on the data generated by ETL and micro-ETL processes. For example, a category view of the second set may be created based on the type of extraction in the ETL process where the data for that view may be selected from a union of the ETL_Data tables and the New version of the corresponding tables. The exemplary second set of category views may include, by way of example and not limitation: demographics, visa, transport and travelling statistics. During the profiler process, these first and second sets of category views may be queried to evaluate rules and sub-rules.

Exemplary views of tax and crime categories may be as follows.

TABLE 12

View for Tax data
VIEW_TAX

FirstName,
LastName,
DateOfBirth,
Tax Year,
Income,
TaxAmt,
Address,
Nationality

TABLE 13

View for Crime data
VIEW_CRIME

FirstName,
LastName,
DateOfBirth,
CrimeCode,
JailLocation,
JailType,
PrisonerNumber,
ArrestDate,
JailTermMonths,
ReleaseDate,
JailEarnings The exemplary tax evader profile may include queries based on the tax and crime views. For example, a tax evader profile may have a threshold weight value of 400 and one rule with an assigned weight of 632. The rule may have two criteria each having a weight of 50% and a threshold weight of 50%. The two criteria may be identification criteria based on the traveler's last name. For example, the two criteria may select entries in the tax view entry having the same last name (i.e., Traveler.LastName=View_Tax.LastName) and entries in the crime view having the same last name (i.e., Traveler.LastName=View_Crime.LastName). The rule may include three sub-rules: sub-rule 1, sub-rule 2, and sub-rule 3. The sub-rule 1 may be a selection criteria for income greater than $50000 and assigned a weight of 420. The sub-rule 2 may be a selection criteria for a taxes paid amount of less than $2000 and assigned a weight of 270. The sub-rule 3 may be a selection criteria for a past crime wherein the past crime is a tax crime, and assigned a weight of 230. The two criteria may be mapped to queries as follows.

```
INSERT INTO Criteria_Result_Detail (<columns>)
SELECT <columns> FROM EXT_DATA
WHERE LastName_Mapped_column=<substitute
last name from new enrollment>
AND SourceType = 'Tax';
INSERT INTO Criteria_Result_Detail (<columns>)
SELECT <columns> FROM EXT_DATA
WHERE LastName_Mapped_column=<substitute
last name from new enrollment>
AND SourceType = 'Crime';
```

In one embodiment, the queries may be formulated when the rule is defined (e.g., by logic implemented in a Profile Manager Application). When a traveler's information is entered in the system, the queries corresponding to the criteria may be dynamically re-formulated to incorporate the traveler's information and the result data set(s) may be generated and inserted into the criteria result detail table 432. Assuming a traveler who is named John Smith, with a Date of Birth of 19700623 and a nationality of Sierra Leone (SL), when this information is entered into the system for a profiler process, the following queries and results may be generated.

TABLE 14

Queries for Rule Criteria for traveler John Smith

| Query | Result | Result Weight |
|---|---|---|
| INSERT INTO Criteria_Result_Detail (<columns>) SELECT <columns> FROM EXT_DATA WHERE C2= 'Smith' AND SourceType = 'Tax'; | Results into 1 row as it is an exact match | 50 |
| INSERT INTO Criteria_Result_Detail (<columns>) SELECT <columns> FROM EXT_DATA | Results into 1 row as it is an exact match | 50 |

TABLE 15

Queries for Sub-rules 1, 2 and 3 for traveler John Smith

| Query | Result | Weight |
|---|---|---|
| SELECT COUNT(*) FROM Criteria_Result_Detail WHERE Income_mapped_column >=50000 AND Source_Type='Tax' | Results into 1 row as it is an exact match | 420 |
| SELECT COUNT(*) FROM Criteria_Result_Detail | No rows selected as Smith has paid more than $2000 in | 0 |

TABLE 15-continued

Queries for Sub-rules 1, 2 and 3 for traveler John Smith

| Query | Result | Weight |
|---|---|---|
| WHERE TaxPaid_mapped_column <=2000 AND Source_Type='Tax' | taxes | |
| SELECT COUNT(*) FROM Criteria_Result_Detail WHERE CrimeCode_mapped_column = 'TaxCrime' AND Source_Type='Crime' | Results into 1 row as it is an exact match | 230 |

The criteria weight threshold of 50 is reached because the sum of the two matched criteria is 100. The profile score may be calculated as follows. There are query matches in sub-rules 1 and 3, so the matched weights over the total weights may be (420+0+230)/(420+270+230)=650/920. The weight for the rule is 632 and thus, the matched sub-rules may generate a weighted score of 632*650/920≈446.51≈447, which is larger than the threshold value of 400. Therefore, there may be a "hit" in the tax evader profile for this traveler. It should be noted that, if the exemplary tax evader profile has a second rule with a weight of 300 and the traveler Smith's information scores 220 on this second rule, the entire tax evader profile will have a score of 447+220=667, still a "hit" for the traveler Smith.

In one embodiment, the profile management may be implemented as a software application referred to as a Profile Manager Application (or simply Profile Manager) as mentioned above. The Profile Manager may be executed in one of the terminals or other computers at a site or any computer remote from the site. The Profile Manager may interact with the tables and stored procedures stored in the profile database 322 to add/remove/update profiles, add/remove/update rules, add/remove/update rule criteria, add/remove/update sub-rules, and/or change weights for each rule/sub-rule of any of the profiles. An authorized user of a POI system according to the present disclosure may also use the Profile Manager to turn individual profiles, rules, and/or sub-rules on or off. The Profile Manager may also assign the threshold values for POI selection. FIGS. 5-11 show exemplary user interfaces of a Profile Manager application for profile and rule management according to the present disclosure.

Figure 5:
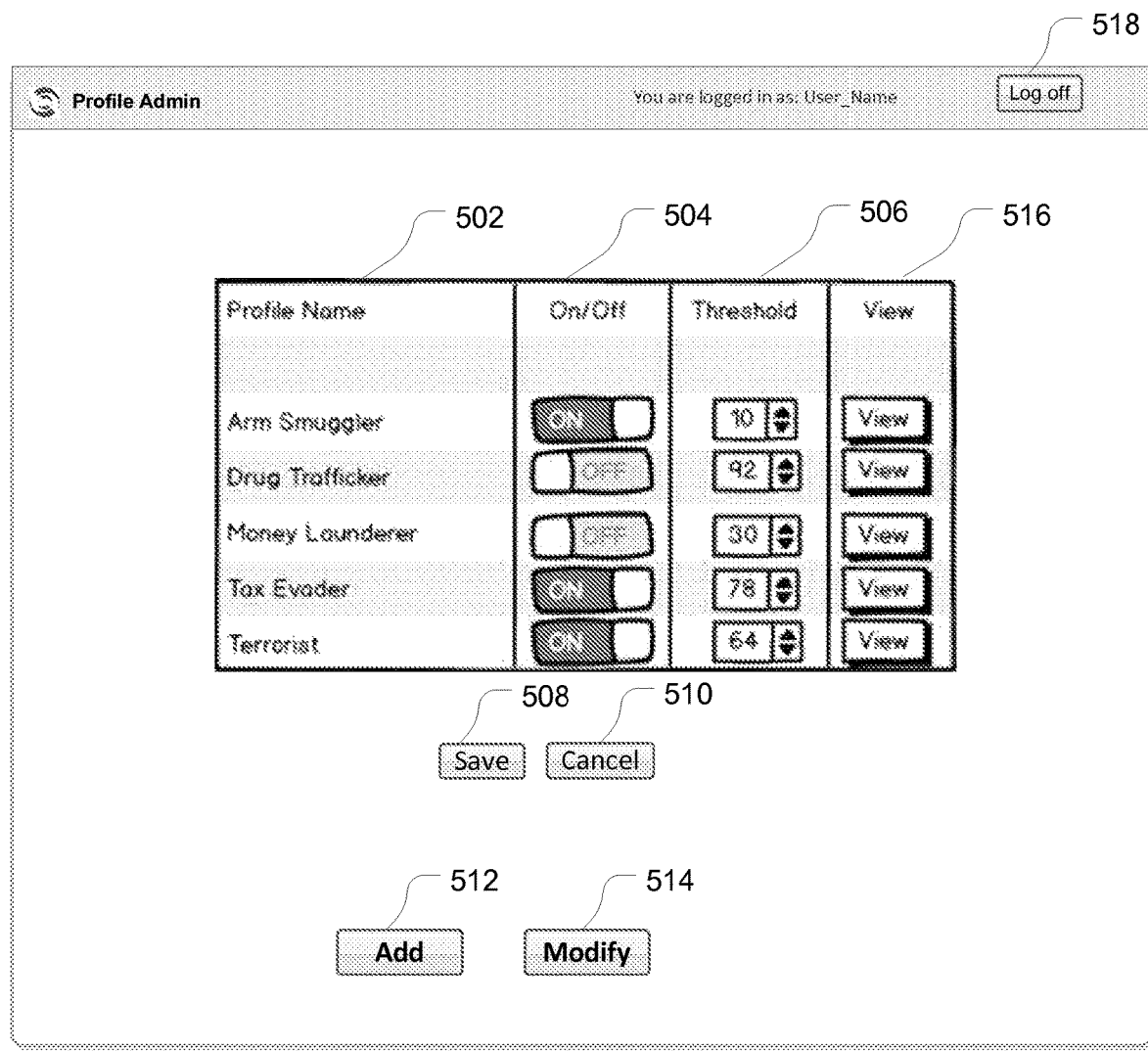
FIGS. 5-11 show exemplary user interfaces for profile and rule management according to the present disclosure.

FIG. 5 may be a main screen 500 for the Profile Manager application according to one exemplary embodiment of the present disclosure. The main screen 500 may comprise a display 502 of existing profiles, on/off display 504 for each existing profile, threshold value 506 for each existing profile and view button 516 for each existing profile. As shown in FIG. 5, one exemplary POI system may comprise 5 pre-defined profiles for arms smuggler, drug trafficker, money launderer, tax evader and terrorist. Each of the 5 pre-defined profiles may be turned on or off and with threshold values of 10, 92, 30, 78 and 64, respectively. In one embodiment, the status of each profile may be toggled "on" or "off" by clicking on switch next to each status display or by other similar means. Moreover, in some embodiments, the "on" status may include options for running in the background, running in the foreground, and running in the foreground with different terminal lock settings. These options will be described in detail below. Further, each threshold value may be adjusted by spinners (e.g., up and down buttons) next to each threshold value (or in some embodiments, with a sliding bar next to each threshold value). The main screen 500 may also comprise a save button 508 to save any changes and a cancel button 510 to cancel any not yet saved changes. Moreover, the main screen 500 may comprise an add button 512 to add a new profile, and a modify button 514 to open any selected existing profile for editing.

Figure 6:
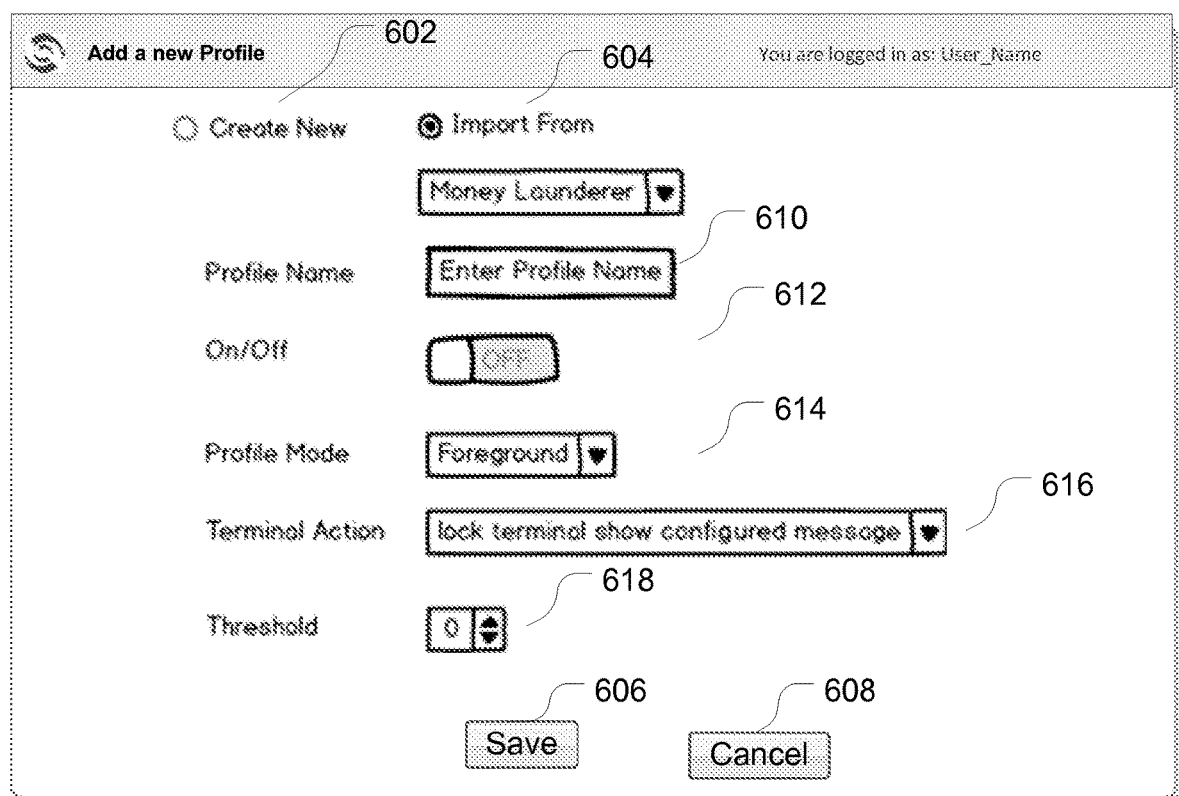

FIG. 6 shows a new profile creation screen 600 according to one exemplary embodiment of the present disclosure. The screen 600 may be displayed when the add button 512 is clicked on the main screen 500. The new profile creation screen 600 may include two radio buttons 602 and 604, and two buttons 606 and 608. The first radio button 602 may be used to create a new profile from scratch and the second radio button 604 may be used to create a new profile by importing an existing profile from a drop down box of existing profiles. The save button 606 may be clicked to save the newly created profile and the cancel button 608 may abort the new profile creation process without saving. The profile name input box 610 may be used to enter a profile name for the new profile. The On/Off switch 612 may be used to set the on or off status for the new profile. The profile mode selection box 614 may be used to select a profile execution mode. For example, the profile execution mode may be one of "background" or "foreground." For the background mode, the profiler process may be executed in the background and any hits may be displayed on a POI monitor when the profiler process completes execution. In the background mode, the terminal does not wait for the process running in the background to complete execution. For the foreground mode, the profiler process may be executed in the foreground and the terminal does not complete the current traveler enrollment until the profiler process completes. If a POI hit occurs in the foreground mode, the hit may be saved in a result table and the POI monitor may show an alert.

The terminal action input box 616 of the screen 600 may be used to select a terminal action when a hit occurs on a profile. Exemplary terminal actions may include: lock terminal & send configured message, send configured message, and none. If the lock terminal & send configured message option is selected, the terminal at which a traveler is being enrolled may be locked when the profile has a hit on the traveler. A configurable message may appear to indicate that additional processing may be needed. The immigration officer will not be able to process additional travelers until a supervisor unlocks the terminal. In some embodiments, this option may be available only when the profiler process is set to run in foreground.

The send configured message option may be used when a message on the terminal's display is sufficient. If this option is selected, when the profile has a hit on a traveler, a configurable message may appear on the terminal's display to indicate to the immigration officer at the terminal that additional processing may be needed. In some embodiments, the immigration officer may simply click O.K. on the message and continue enrolling travelers. Just like the lock terminal & send configured message option, this option may be available only when the profiler process is set to run in foreground. The third option, "none," may be a default setting if no particular option is explicitly selected, in which no additional actions are taken at the terminal when a profile has a hit on a traveler.

The threshold setting box 618 of the screen 600 may be used to set a threshold value for the new profile being created.

When the save button 606 is clicked, the Profile Manager may return to the main Profile Manager screen 500 where the newly created profile may be added to the list of profiles. In some embodiments, each new profile by default may be turned off. Further, in some embodiments, when saving the newly created profile, some validation may be performed. For example, the newly created profile's profile name may be checked to ensure the chosen profile name is not already in use with another profile. If the profile name is already in use, a message may appear to prompt for another name. In some embodiments, the profile name may be highlighted, such as displaying in red to indicate an issue about the profile name. In another example, the threshold value may be checked and if the threshold is not entered, it may be atomically set to zero at time of save. In a non-limiting embodiment, the newly created profile may be saved only after the validation process passes successfully.

Figure 7:
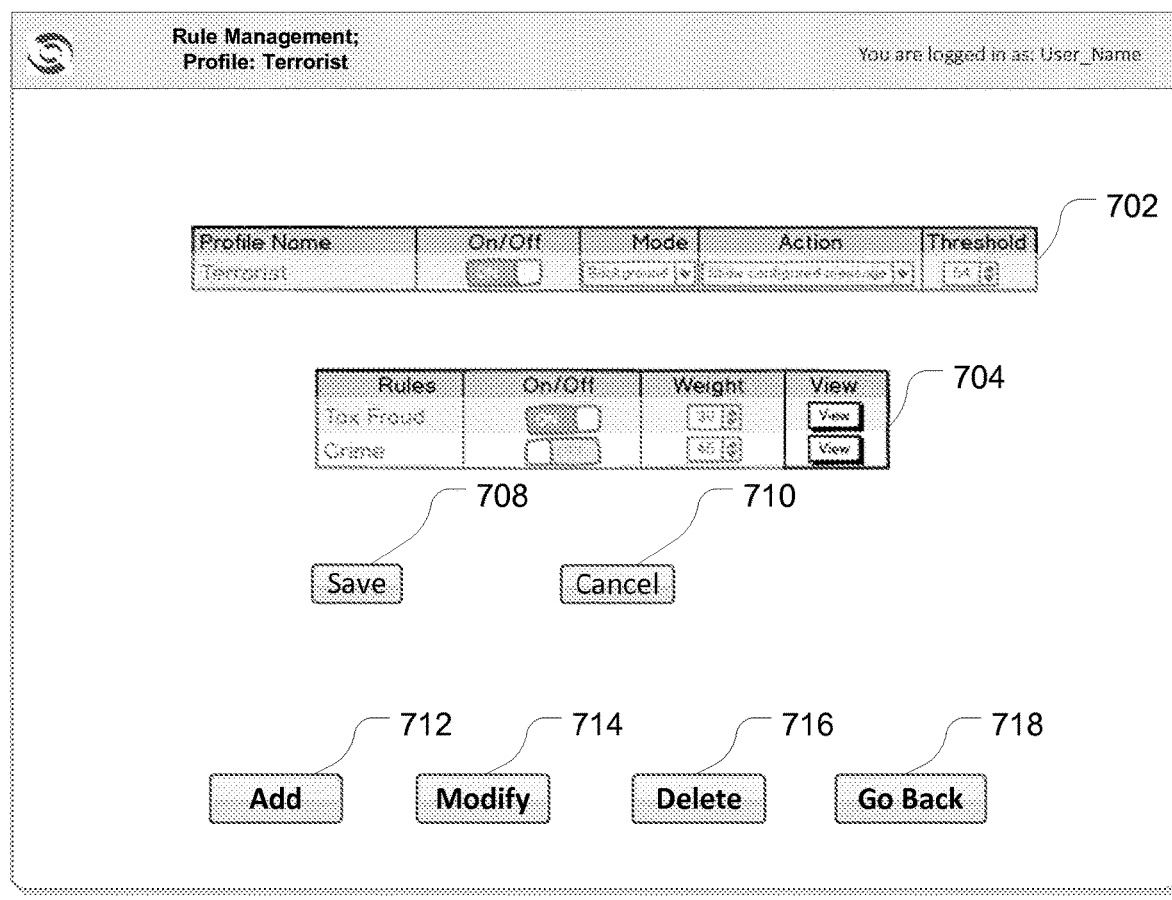

FIG. 7 shows a rule manager screen 700 according to one exemplary embodiment of the present disclosure. The screen 700 may be displayed when a profile may be selected from the display 502 of existing profiles and the corresponding view button 516 is clicked on the main screen 500. The rule manager screen 700 may comprise a display 702 of the selected profile and a display 704 of existing rules for the selected profile. The display 702 may include profile name, on/off status, profile mode, terminal action and threshold for the selected profile. The display 704 may include a list of existing rules for the selected profile with rule names, on/off status for each existing rule, and weight assigned to each rule and a view button for each rule. As shown in FIG. 7, one exemplary terrorist profile may include two rules: tax fraud and crime. In one embodiment, the on/off status, profile mode, terminal action and threshold for the selected profile may be changed on the screen 700 directly. Also, the on/off status and weight for each existing rule may be changed on the screen 700 as well. The rule manager screen 700 may also comprise a save button 708 to save any changes and a cancel button 710 to cancel any not yet saved changes. Moreover, the rule manager screen 700 may comprise an add button 712 to add a new rule, a modify button 714 to open any selected existing rule for editing, a delete button 716 to delete any selected existing rule(s) and a go back button 718 to return to a previous screen (a user may be prompted for any unsaved changes).

In one embodiment, when a profile is being edited (adding a rule, changing a rule, etc.), a working copy of the profile may be created and the original profile may be automatically locked in the profile database 322. The profile may be still active, for example, the status being On, for the POI process to use for enrollments. Once all changes are complete, the user needs to save and commit the changes to replace the active version with the updated version in the profile database 322. The user may be able to commit after a new rule is created and saved, or an existing rule is updated and saved, or the profile/rule settings on FIG. 7 are updated and saved. In some embodiments, the changes may be saved and worked on later before being committed. If the working copy is not committed but only saved, the user may be prompted to choose what version of the profile he or she wants to update ("active" or "working copy created/last modified by <user name>") when the user returns to the rule later. The user may choose the version he or she worked on before and is able to continue to make changes.

Figure 8:
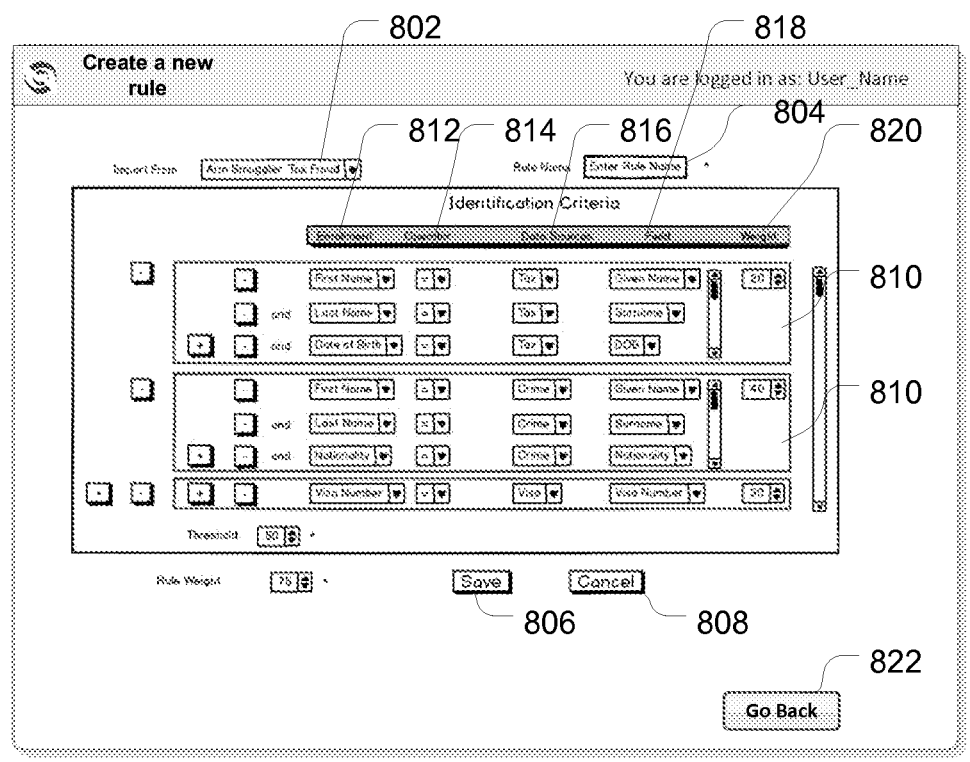

FIG. 8 shows a new rule creation screen 800 according to one exemplary embodiment of the present disclosure. The screen 800 may be displayed when the add button 712 is clicked on the rule manager screen 700. The new rule creation screen 800 may include an input drop down box 802 and text entry box 804, one or more criteria building blocks 810 and three buttons 806, 808 and 822. The input drop down box 802 may be used to select an existing rule (e.g., listed alphabetically by profile/rule) to import from and the text entry box 804 may be used to enter a rule name. The criteria building blocks 810 may be used to define one or more identification criteria. Each criteria building blocks 810 may facilitate identifying the enrollment column 812, operator 814, data source 816, data field 818 and weight for criteria 820.

In one embodiment, the available enrollment column 812 may include the following data fields: First Name, Last Name, Gender, Date of Birth, Nationality, Enrollment Date, Originating Country, Final Destination Country, Station ID, Station Mode, Document Number, Document Expiration Date, Document Type Name, Fingerprint, Visa Number, Visa Issue Date, Visa Expiration Date, Transport Company Name, Flight Number, and other suitable identification information (such as photo, biometrics information, traveler details, passport chip number, etc.).

Based on the selection of the enrollment column field 812, one or more operators in the table 15 below may be available for selection in the operator field 814. In some embodiments, the operator "in" may compare each field type (text or numeric) to each data source field type (text or numeric).

TABLE 15

Applicable Operators for the operator field 814

| Data type | Operator(s) |
| --- | --- |
| Text (i.e. first name/last name, nationality, originating country, final destination) | =, similar, contains, begins with, ends with |
| Numeric (i.e. expiration date, station ID, flight number, doc number, DOB) | =, |
| Combination of Numeric/text (i.e. selecting First Name/Last Name/DOB/Nationality | =, similar (only applies to the text, the numeric automatically uses =), in |

The data source field 816 may be used to select a data source, and the data source field 818 may be used to select an appropriate data field from the selected data source. The weight field 820 may be used to define the weight for the criteria. In one non-limiting embodiment, up to ten criteria may be defined using the screen 800.

Once the criterion is/are defined, a criteria threshold may be assigned. As described above, during operation, if the sum of the weights for the matched criteria is equal to or greater than the threshold, the criteria may be deemed as passed, and any sub-rules defined may run against the set of data selected according to the criteria on the new enrollment.

In some embodiments, while defining criteria for a rule, a data source may be used multiple times, or multiple data sources may be used. The data sources selected in the data source field 816 may be available to the sub-rule definition. For example, a matching criteria may have a condition of Traveler.FirstName=Tax.FristName. In this case, the criteria may be executed and weight of the criteria may exceed the defined criteria threshold. Then, the sub-rules may run on the tax data that has matched the traveler's information. It should be noted that while defining a condition for criteria, multiple comparisons may be made between traveler's enrollment information and data source(s). Moreover, two data source fields in the criteria may be linked. For example, one data field may be present in more than one data sources, such as, the "tax payer identification" may appear in two different data sources of Tax and Education. This linkage may be done during data importing or loading and/or profile creation.

The user may cancel what has been done to the criteria definition by clicking on the cancel button 808. This may remove any entries made by the user prior to clicking on the cancel button 808. The add button 806 may be clicked to save the newly created rule. In some embodiments, to add a sub-rule, the rule itself must be saved with a name. Once the rule with the defined criteria is saved, an add sub-rule button may appear and thus, the user may have the option to create a sub-rule by clicking on the add sub-rule button. The go back button 822 may allow a user to navigate back to a previous screen (e.g., the screen 700). In some embodiments, a prompt may be displayed if there are any unsaved changes for the rule on screen 800 when the button 822 is clicked. Also, in some embodiments a new rule may be turned "off" by default.

As described above, criteria may be optional for a rule. When no criteria is defined for a rule, the traveler's enrollment information and internal statistical information may be available for the sub-rule definition. In some embodiments, a rule may have criteria but no sub-rules. In these embodiments, if the criteria is evaluated to be true (meets the threshold), then the rule may be true and get full weights assigned to the rule.

Figure 9:
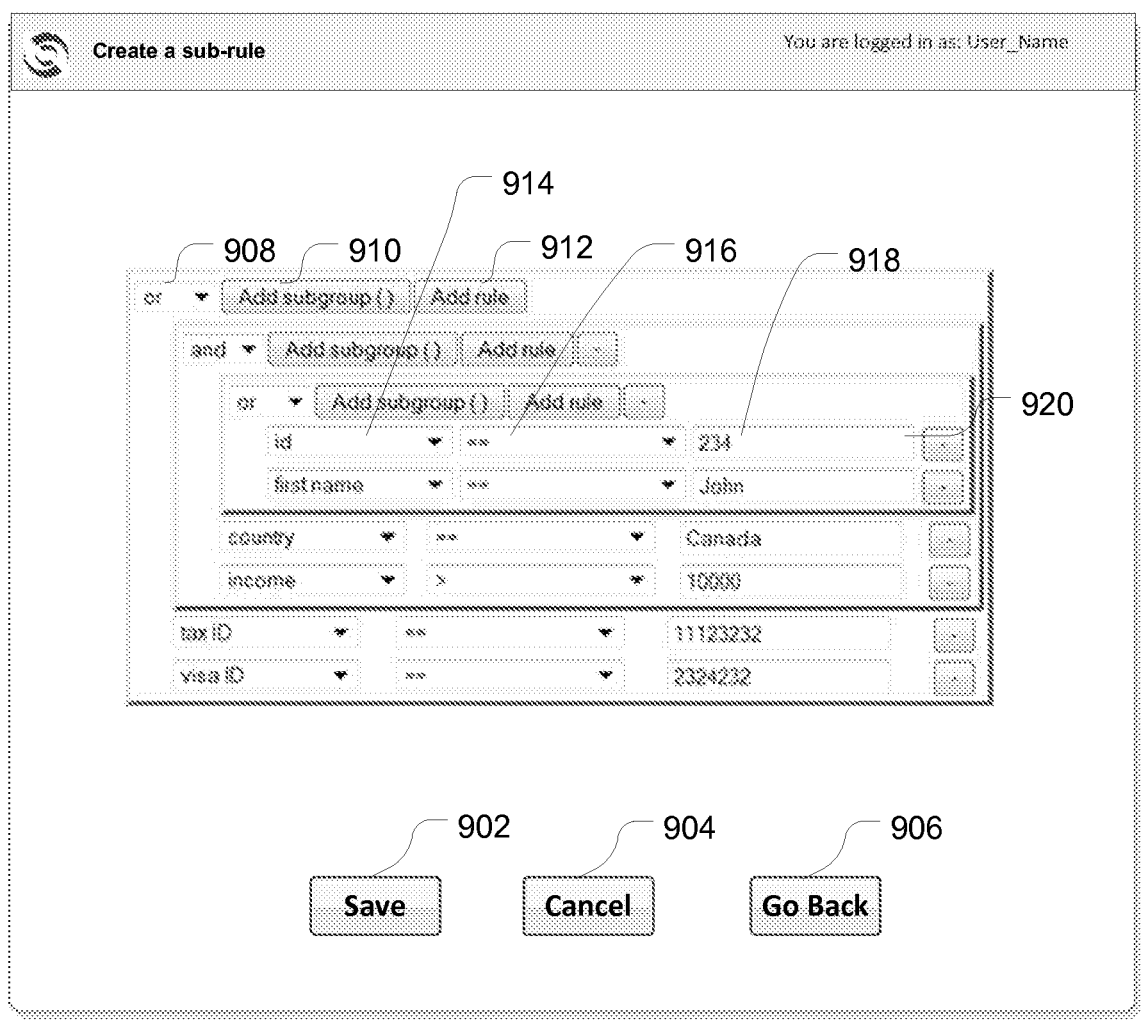

FIG. 9 shows a sub-rule creation screen 900 according to one exemplary embodiment of the present disclosure. The sub-rule creation screen 900 may comprise a save button 902 to save new sub-rules, a cancel button 904 to cancel the newly created sub-rule and a go back button 906 to go back to a previous screen such as the screen 800. In one non-limiting embodiment, a user may be prompted for any unsaved changes. The sub-rule creation screen 900 may further comprise one or more conditions 920 that each may include a data field 914, an operator 916 and a condition value 918. If more than one condition is in the sub-rule, the conditions may be grouped in sub groups created by respective add subgroup button 910 and new conditions may be created in the respective subgroups by respective add rule button 912. The conditions may be linked by respective connectors 908 (e.g., "and" or "or").

In some embodiments, the data sources available in the sub-rule being created on the sub-rule creation screen 900 may be limited to what may have been defined in the criteria, as well as the enrollment and statistical internal data sources available. For example, if a data source "education" is not selected in the criteria definition, the sub-rule being created cannot use "education" as a data source. The following table 16 includes available operators that may be used in the operator field 918.

TABLE 16

Applicable Operators for the operator field 916

| Data type | Operator(s) |
| --- | --- |
| Text (i.e. first name/last name, nationality, originating country, final destination) | =, similar, contains, begins with, ends with, != |
| Numeric (i.e. expiration date, station ID, flight number, doc number, DOB) | =, >=, <=, >, <, != |

A condition may have a single data source or compare data fields from multiple data sources. For the sub-rule evaluation, each condition may be evaluated depending upon the "and" or "or" connector of all other conditions mentioned in that sub-rule. All conditions may be executed and results may be recorded during a rule evaluation. For example, a sub-rule may have the s separate conditions A, B, C, D, E and F being grouped together in (A and B) or (C and D) or (E and F). If any one of (A and B), (C and D), or (E and F) is true, then the sub-rule may get the full weight during the profiler process evaluating this sub-rule.

Figure 10:
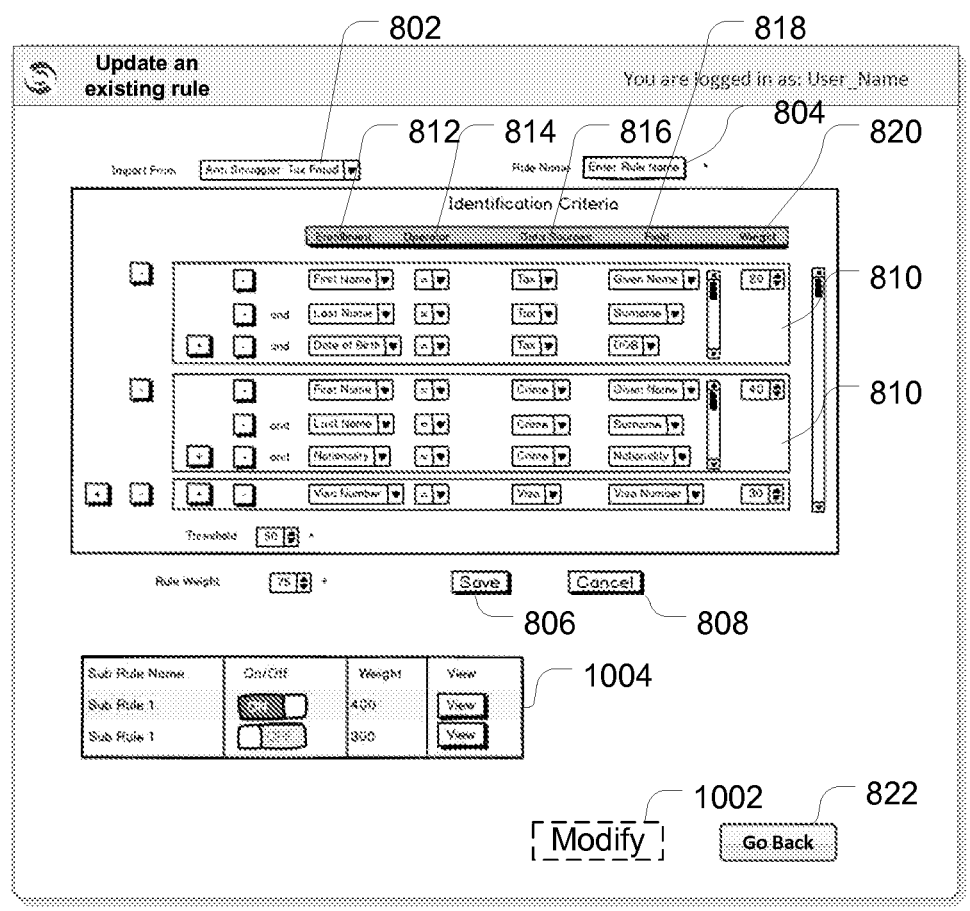

FIG. 10 shows a sub-rule edit screen 1000 according to one exemplary embodiment of the present disclosure. The sub-rule edit screen 1000 may be displayed when a user clicks the view button 704 on the rule manager screen 700. The sub-rule edit screen 1000 may show a view mode of the screen 800. In this view mode, a modify button 1002 may be added to the screen 800 and the screen 1000 may be read only. That is, no changes may be made to the rule being displayed on the screen 1000 and the buttons 806, 808 and 822 may be disabled. Once the modify button 1002 is clicked, the modify button 1002 may be disabled (e.g., shown in dashed line) and rest of the screen 1000 may become active like on the screen 800. In some embodiments, a list of sub-rules for the respective rule may be displayed in a list 1004 on the screen 1000. The list 1004 may be in the view mode initially and activated like other components of the screen 1000 when the modify button 1002 is clicked.

Figure 11:
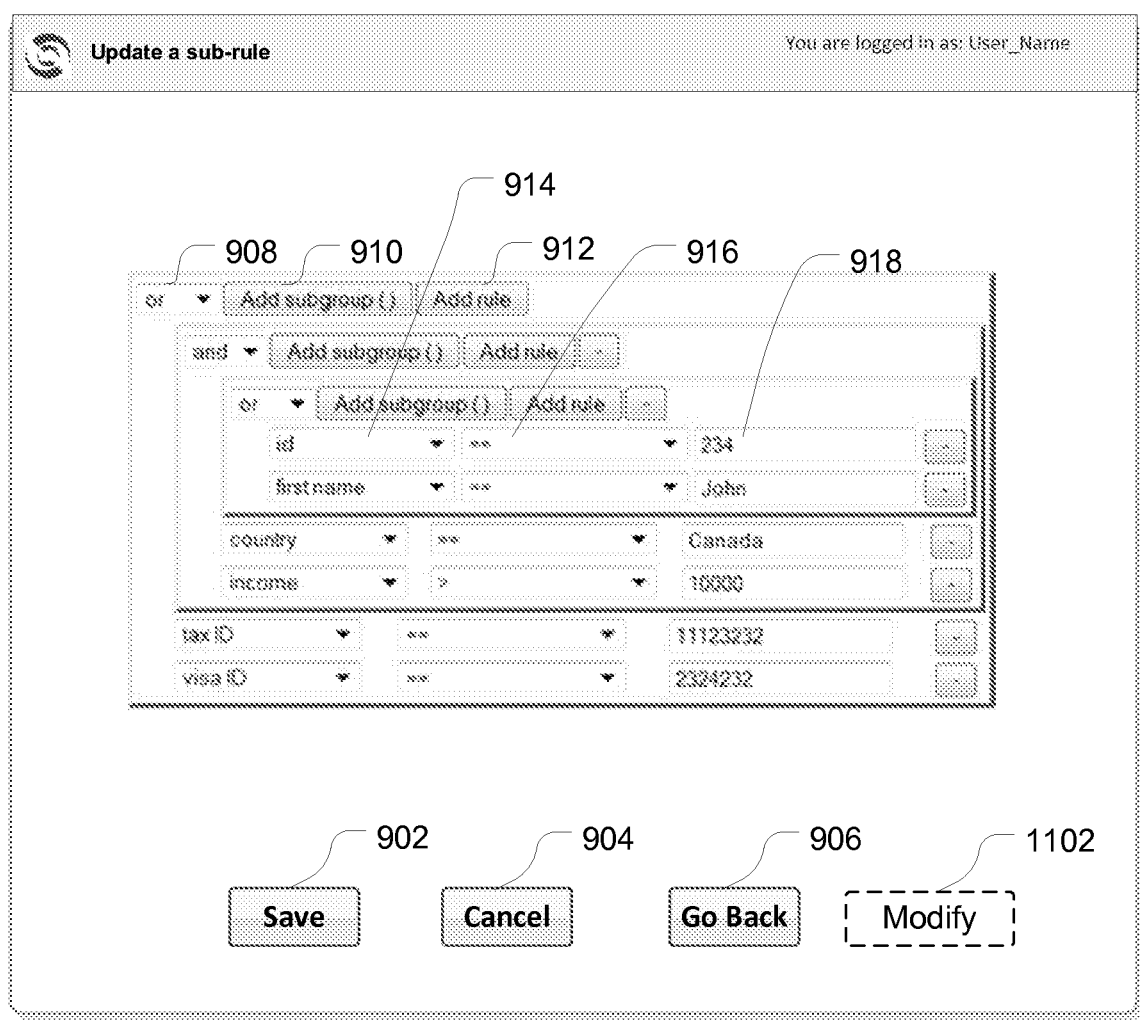

FIG. 11 shows a sub-rule edit screen 1100 according to one exemplary embodiment of the present disclosure. The sub-rule edit screen 1100 may be displayed when the view button corresponding to a sub-rule in the list 1004 is clicked on FIG. 10. The sub-rule edit screen 1100 may show a view mode of the screen 900. In this view mode, a modify button 1102 may be added to the screen 900 and the screen 1100 may be read only. That is, no changes may be made to the sub-rule being displayed on the screen 1100 and the buttons 902, 904 and 906 may be disabled. Once the modify button 1102 is clicked, the modify button 1102 may be disabled (e.g., shown in dashed line) and rest of the screen 1100 may become active like on the screen 900.

Figure 12:
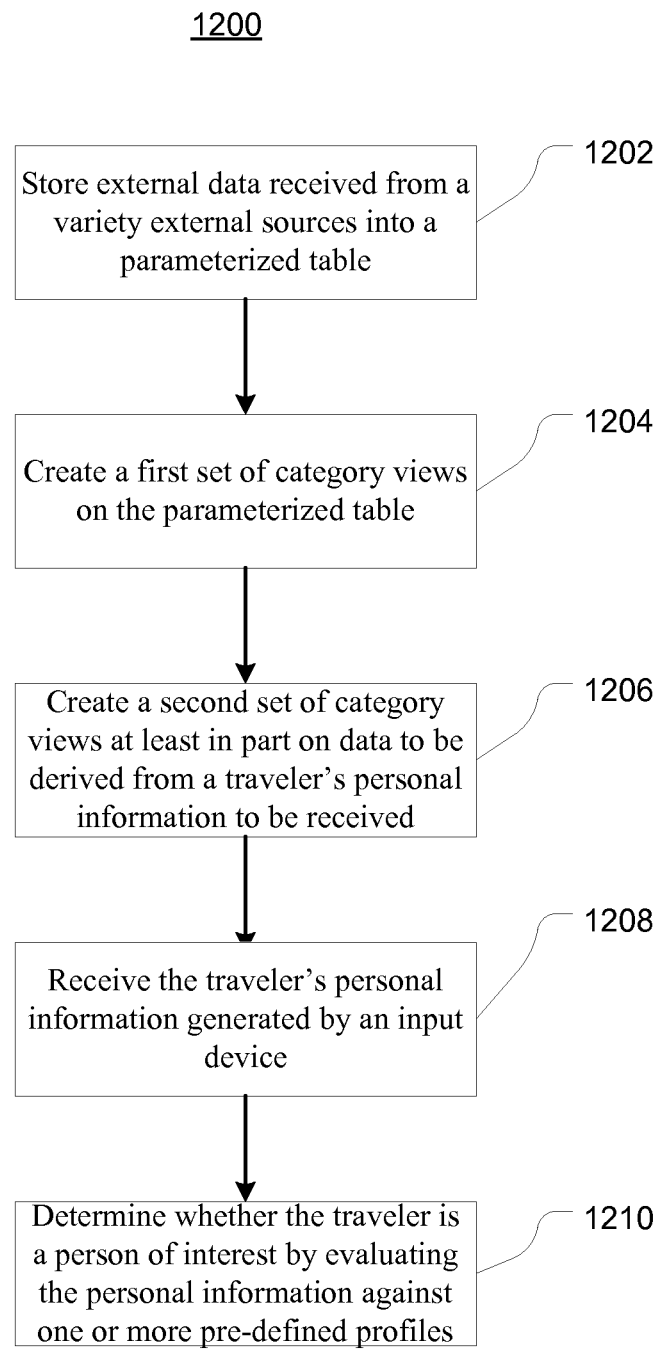
FIG. 12 is a flow diagram of one exemplary method according to the present disclosure.

FIG. 12 shows an exemplary method 1200 according to one exemplary embodiment of the present disclosure. At block 1202, external data received from a variety external sources may be saved into a parameterized table. As described above, the parameterized table shown in Table 6 may be used to store data from a variety of external data sources. The mapping may be controlled by the configuration file when the data is loaded in the parameterized table. Then, at block 1204, a first set of category views may be created on the parameterized table. For example, each category view of the first set may correspond to a Category Name specified in the configuration files for various external data sources.

At block 1206, a second set of category views based at least in part on data to be derived from a traveler's personal information to be received may be created. As described above, when an enrollment is performed, the traveler's data may be saved into one or more databases and a micro_ETL process may be executed on the traveler's data. The micro-ETL process may generate locally atomized data and a second set of category views may be created on a union of the locally atomized data and ETL_Data. It should be noted that while the data from the micro-ETL process may be available only at the enrollment, the category view definition may be created at a design time prior to the enrollment process.

At block 1208, the traveler's personal information generated by an input device may be received. As described above, when an enrollment is performed, the traveler's data may be saved into one or more databases. In the meantime, any watch list (if defined) and data replication processes may start. At block 1210, the method 1200 may determine whether the traveler is a person of interest by evaluating the personal information against one or more pre-defined profiles using the first and second sets of category views. For example, one or more pre-defined profiles may be stored in a database and a profiler process may start for any pre-defined profiles in the database that may be turned on. Each of the one or more pre-defined profiles may comprise one or more rules and a threshold value for determining a likelihood for the traveler to be matched in each of the one or more pre-defined profiles. It should be noted that, in one non-limiting embodiment, the profiler process does not replace any existing watch list and traveler information may be sent to an out-of-site database (e.g., regional or center database) for the watch list check. Moreover, in some embodiments, the profiler process may be started once the demographic and biometric compare processes for any existing watch list have completed.

The outcome of the profiler process may be a risk probability (score) for each profile run on the first and second sets of the category views. If the score exceeds a pre-defined threshold for a respective profile, a new row may be inserted into a POI table and according to a pre-defined configuration, the specific terminal at which the traveler was enrolled may receive a message. In the meantime, an alert may be raised on a POI monitor.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computer-implemented method for identifying a person of interest, comprising:
    storing external data received from a plurality of external sources into a staging table having a first format;
    transferring validated external data from the staging table to a parameterized table having a second format;
    creating a first set of category views on the parameterized table, wherein the first set of category views are based on data sources associated with a traveler;
    receiving personal information of the traveler generated by a biometrics and/or other input device;
    creating a second set of category views in real-time based at least in part on data derived from the traveler's received personal information, wherein the second set of category views are non-overlapping from the first set of category views;
    creating a plurality of pre-defined profiles, wherein each pre-defined profile comprises a plurality of characteristics associated with a particular category of behavior, each pre-defined profile defines a different type of risk, using the first and second sets of category views, and each pre-defined profile comprises one or more rules and a corresponding threshold value;
    comparing the traveler's received personal information against the plurality of characteristics contained within each of the pre-defined profiles;
    generating a score of likelihood for the traveler in each of the pre-defined profiles based on the one or more corresponding rules of each of the pre-defined profiles, and determining whether the traveler is a person of interest by determining if each score of likelihood exceeds the corresponding threshold value, wherein the traveler may be associated with multiple categories of behaviors;
    inserting a row into a person of interest table based on the score of likelihood for the traveler exceeding the corresponding threshold for at least one of the pre-defined profiles;
    outputting a message to a terminal of the traveler; and
    providing an alert to a person of interest monitor.

2. The method of claim 1, wherein each of the one or more rules comprises one or more sub-rules, and each rule and each sub-rule has a pre-determined weight, and a final score for a likelihood for the traveler to be matched is generated by summing sub scores for each rule, each sub score for a respective rule is generated by multiplying a total weight percentage of satisfied sub-rules of the respective rule and the respective rule's pre-determined weight.

3. The method of claim 1, wherein at least one of the one or more rules comprises one or more criteria that each defines one or more conditions to identify a selected subset of data based on traveler's information.

4. The method of claim 3, wherein the at least one of the one or more rules comprises one or more sub-rules, and the one or more sub-rules are based on data source(s) identified in the one or more criteria.

5. The method of claim 1, wherein the second set of category views are created on combined data including extracted statistical data and the data derived from the received traveler's personal information.

6. The method of claim 1, wherein the external data is first received in a staging table having a same structure as the parameterized table and transferred to the parameterized table if there is no error.

7. The method of claim 1, wherein the other input device is one of a passport scanner, a digital camera, and a keyboard.

8. A system for identifying a person of interest, comprising:
a processor, and
a storage memory coupled to the processor, the processor configured to:
store external data received from a plurality of external sources into a staging table having a first format;
transfer validated external data from the staging table to a parameterized table having a second format;
create a first set of category views on the parameterized table, wherein the first set of category views are based on data sources associated with a traveler;
receive personal information of the traveler generated by a biometrics and/or other input device;
create a second set of category views in real-time based at least in part on data derived from the traveler's received personal information, wherein the second set of category views are non-overlapping from the first set of category views;
create a plurality of pre-defined profiles, wherein each pre-defined profile comprises a plurality of characteristics associated with a particular category of behavior, each pre-defined profile defining a different type of risk, using the first and second sets of category views, and each pre-defined profile comprising one or more rules and a corresponding threshold value;
compare the traveler's received personal information against the plurality of characteristics contained within each of the pre-defined profiles; and
generate a score of likelihood for the traveler in each of the pre-defined profiles based on the one or more corresponding rules of each of the pre-defined profiles, and determine whether the traveler is a person of interest by determining if each score of likelihood exceeds the corresponding threshold, wherein the traveler may be associated with multiple categories of behaviors;
insert a row into a person of interest table based on the score of likelihood for the traveler exceeding the corresponding threshold for at least one of the pre-defined profiles;
output a message to a terminal of the traveler; and
provide an alert to a person of interest monitor.

9. The system of claim 8, wherein each of the one or more rules comprises one or more sub-rules, and each rule and each sub-rule has a pre-determined weight, and a final score for a likelihood for the traveler to be matched is generated by summing sub scores for each rule, each sub score for a respective rule is generated by multiplying a total weight percentage of satisfied sub-rules of the respective rule and the respective rule's pre-determined weight.

10. The system of claim 8, wherein at least one of the one or more rules comprises one or more criteria that each defines one or more conditions to identify a selected subset of data based on traveler's information.

11. The system of claim 10, wherein the at least one of the one or more rules comprises one or more sub-rules, and the one or more sub-rules are based on data source(s) identified in the one or more criteria.

12. The system of claim 8, wherein the second set of category views are created on combined data including extracted statistical data and the data derived from the received traveler's personal information.

13. The system of claim 8, wherein the data sources are first received in a staging table having a same structure as the parameterized table and transferred to the parameterized table if there is no error.

14. The system of claim 8, wherein the other input device is one of a passport scanner, a digital camera, and a keyboard.

15. A non-transitory computer-readable storage medium stored thereon executable code that when executed, performs a method for identifying a person of interest comprising:
storing external data received from a plurality of external sources into a staging table having a first format;
transferring validated external data from the staging table to a parameterized table;
creating a first set of category views on the parameterized table having a second format, wherein the first set of category views are based on data sources associated with a traveler;
receiving personal information of the traveler at an enrollment generated by a biometrics and/or other input device;
creating a second set of category views in real-time based at least in part on data derived from the traveler's received personal information, wherein the second set of category views are non-overlapping from the first set of category views;
creating a plurality of pre-defined profiles, wherein each pre-defined profile comprises a plurality of characteristics associated with a particular category of behavior, each pre-defined profile defines a different type of risk, using the first and second sets of category views, and each pre-defined profile comprises one or more rules and a corresponding threshold value;
comparing the traveler's received personal information against the plurality of characteristics contained within each of the pre-defined profiles; and
generating a score of likelihood for the traveler in each of the pre-defined profiles based on the one or more corresponding rules of each of the pre-defined profiles, and determining whether the traveler is a person of interest by determining if each score of likelihood exceeds the corresponding threshold value, wherein the traveler may be associated with multiple categories of behaviors;
inserting a row into a person of interest table based on the score of likelihood for the traveler exceeding the corresponding threshold for at least one of the pre-defined profiles;
outputting a message to a terminal of the traveler; and
providing an alert to a person of interest monitor.

16. The non-transitory computer-readable storage medium of claim 15, wherein each of the one or more rules comprises one or more sub-rules, and each rule and each sub-rule has a pre-determined weight, and a final score for a likelihood for the traveler to be matched is generated by summing sub scores for each rule, each sub score for a respective rule is generated by multiplying a total weight percentage of satisfied sub-rules of the respective rule and the respective rule's pre-determined weight.

17. The non-transitory computer-readable storage medium of claim 15, wherein at least one of the one or more rules comprises one or more criteria that each defines one or more conditions to identify a selected subset of data based on traveler's information.

18. The non-transitory computer-readable storage medium of claim 17, wherein the at least one of the one or more rules comprises one or more sub-rules, and the one or more sub-rules are based on data source(s) identified in the one or more criteria.

19. The non-transitory computer-readable storage medium of claim 15, wherein the second set of category views are created on combined data including extracted statistical data and the data derived from the received personal information.

20. The non-transitory computer-readable storage medium of claim 15, wherein the external data is first received in a staging table having a same structure as the parameterized table and transferred to the parameterized table if there is no error.

21. The method of claim 1, wherein the first format of the staging table is unindexed or unpartitioned, and the second format of the parameterized tables is indexed or partitioned, both the first format and the second format being configured to preserve a mapping to the external sources.

22. The system of claim 8, wherein the first format of the staging table is unindexed or unpartitioned, and the second format of the parameterized tables is indexed or partitioned, both the first format and the second format being configured to preserve a mapping to the external sources.

23. The non-transitory computer-readable storage medium of claim 15, wherein the first format of the staging table is unindexed or unpartitioned, and the second format of the parameterized tables is indexed or partitioned, both the first format and the second format being configured to preserve a mapping to the external sources.

* * * * *